United States Patent [19]
Jaw

[11] Patent Number: 5,405,113
[45] Date of Patent: Apr. 11, 1995

[54] BICYCLE PADLOCK HOLDER

[76] Inventor: Chin-Woei Jaw, No. 32, Alley 8, Lane 65, Chang Yuan Str., San Chung, Taipei Hsien, Taiwan, Prov. of China

[21] Appl. No.: 185,009

[22] Filed: Jan. 24, 1994

[51] Int. Cl.6 ............................................. E04G 3/00
[52] U.S. Cl. ...................... 248/229; 70/233; 224/39; 248/552
[58] Field of Search ............ 248/229, 552, 551, 316.2, 248/316.1; 70/233, 51; 224/30 R, 30 A, 31, 39

[56] References Cited
U.S. PATENT DOCUMENTS

| | | | |
|---|---|---|---|
| 3,967,475 | 7/1976 | Zane | 224/39 X |
| 4,155,231 | 5/1979 | Zane et al. | 70/233 X |
| 4,736,921 | 4/1988 | Zane et al. | 248/229 X |
| 5,076,526 | 12/1991 | Zane et al. | 224/39 X |

Primary Examiner—Ramon O. Ramirez
Attorney, Agent, or Firm—Bacon & Thomas

[57] ABSTRACT

A bicycle padlock holder includes a mounting frame fitted around the seat tube of a bicycle and fixed in place by screw bolts and nuts, a padlock carrier frame connected to the mounting frame and controlled by a tightening up device to carry a bicycle padlock, wherein the mounting frame has a horizontal lug fitted into a space between two horizontal lugs on the mounting frame and turned about a pivot between the horizontal lugs of the mounting frame and then alternatively fixed in any of a series positions around the pivot by a screw bolt.

1 Claim, 5 Drawing Sheets

BICYCLE PADLOCK HOLDER

BACKGROUND OF THE INVENTION

The present invention relates to a padlock holder for carrying a bicycle padlock on bicycle.

There is known a bicycle padlock holder, as shown in FIG. 1, for carrying a bicycle padlock on the seat tube of a bicycle. The bicycle padlock holder is of molded plastics having a mounting portion and a padlock carrier portion joined at right angles. The mounting portion is fixed to the seat tube of a bicycle by screws and nuts. The padlock carrier portion is controlled by a tightening up device for keeping a bicycle padlock. FIG. 2 shows a similar structure of bicycle padlock holder in which the mouths of the mounting portion and padlock carrier portion thereof are disposed in reversed directions. The common drawback of the aforesaid two different bicycle padlock holders is that the position of the padlock carrier portion can not be adjusted relative to the mounting portion. Therefore, the installation of such a bicycle padlock holder may hinder the loading of other bicycle accessories (canteen, bicycle pump, etc.) on the bicycle.

FIG. 3 shows still another structure of bicycle padlock holder according to the prior art which is comprised of a mounting member fastened to the seat tube of a bicycle by a screw and a nut and having a dovetail groove longitudinally disposed at one side, and a detachable padlock carrier having a plurality of spaced dovetail tongues alternatively fastened to the dovetail groove on the mounting member. This structure of bicycle padlock holder can be adjusted to change the direction of the padlock carrier relative to the mounting member, however the dovetail tongues and the dovetail groove wear off quickly, and therefore this structure of bicycle padlock holder is not durable in use.

SUMMARY OF THE INVENTION

The present invention has been accomplished to provide a bicycle padlock holder for keeping the bicycle padlock which eliminates the drawbacks of the aforesaid prior art bicycle padlock holders. According to the preferred embodiment of the present invention, the mounting frame has a horizontal lug fitted into a space between two horizontal lugs on the mounting frame and turned about a pivot between the horizontal lugs of the mounting frame. The horizontal lugs of the mounting frame have screw holes spaced around the pivot. The padlock carrier frame has a screw hole alternatively connected to the screw holes on the horizontal lugs of the mounting frame. By changing the connection between the screw hole on the padlock carrier frame and the screw holes on the mounting frame, the angular position of the padlock carrier frame relative to the mounting frame is adjusted.

DETAILED DESCRIPTION OF THE PREFERRED EMBODIMENT

Figure 1:
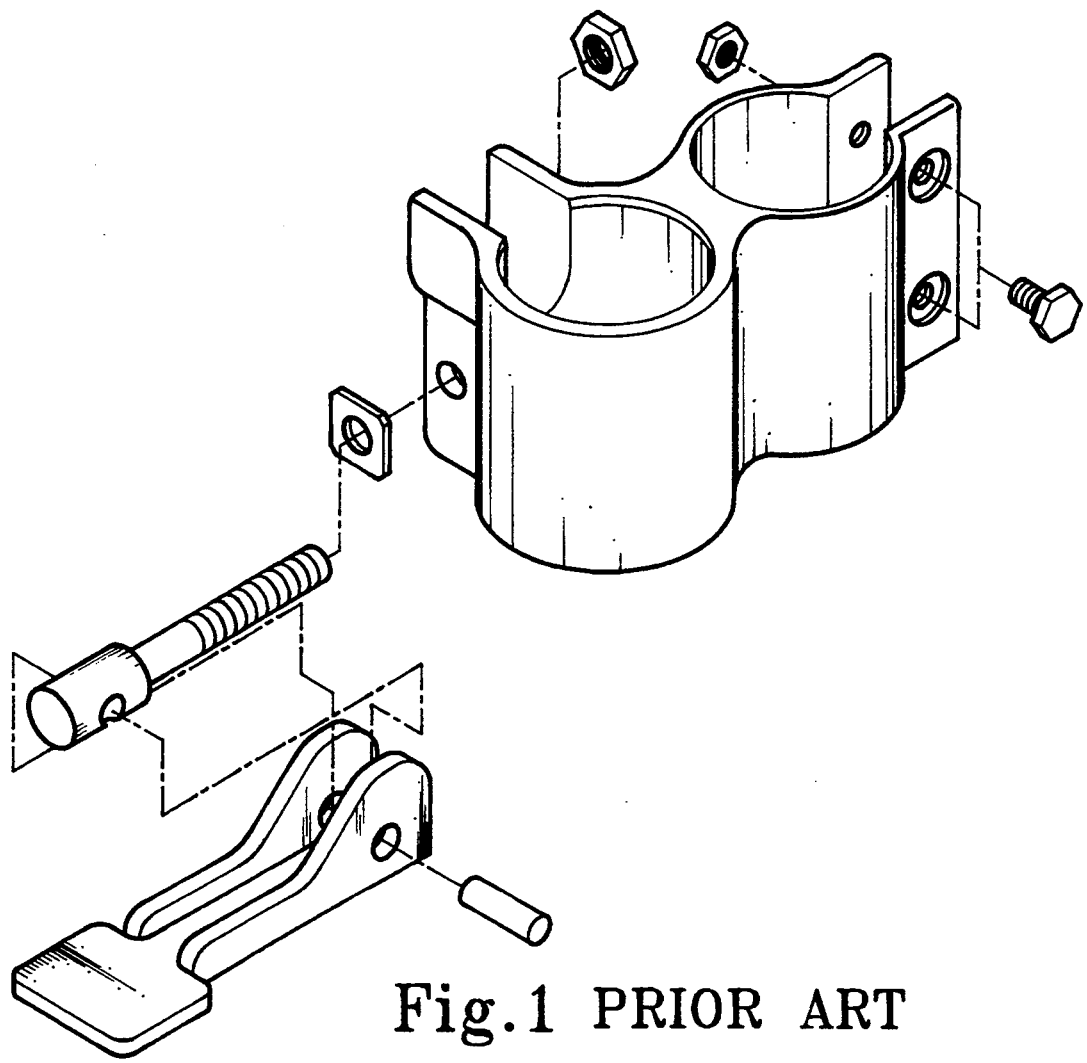
FIG. 1 shows a bicycle padlock holder according to the prior art.
Figure 2:
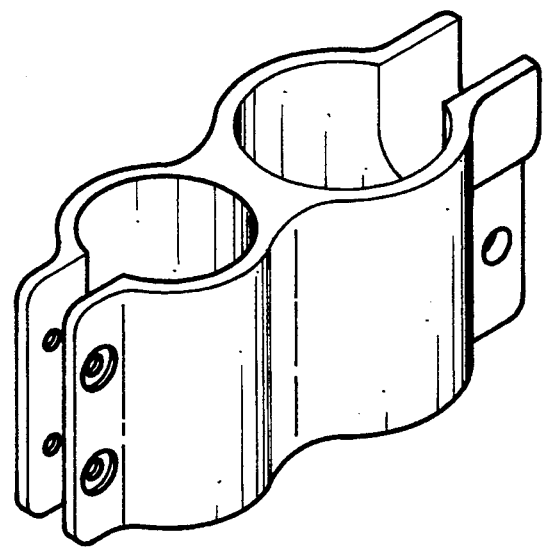
FIG. 2 shows another structure of bicycle padlock holder according to the prior art.
Figure 3:
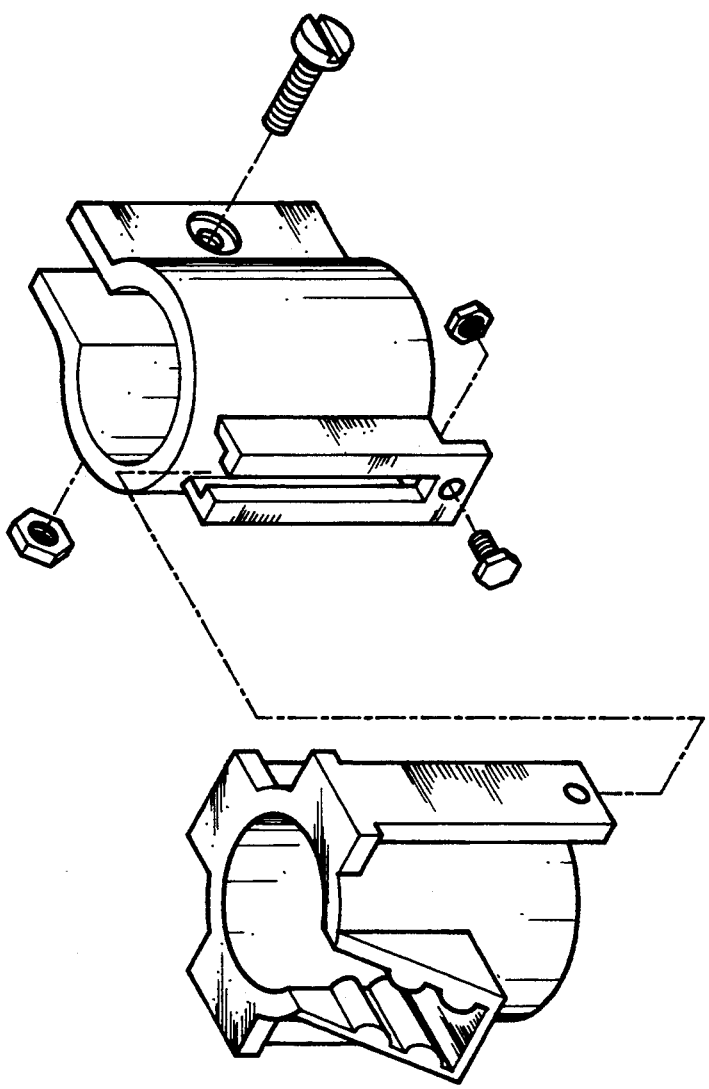
FIG. 3 shows still another structure of bicycle padlock holder according to the prior art.
Figure 4:
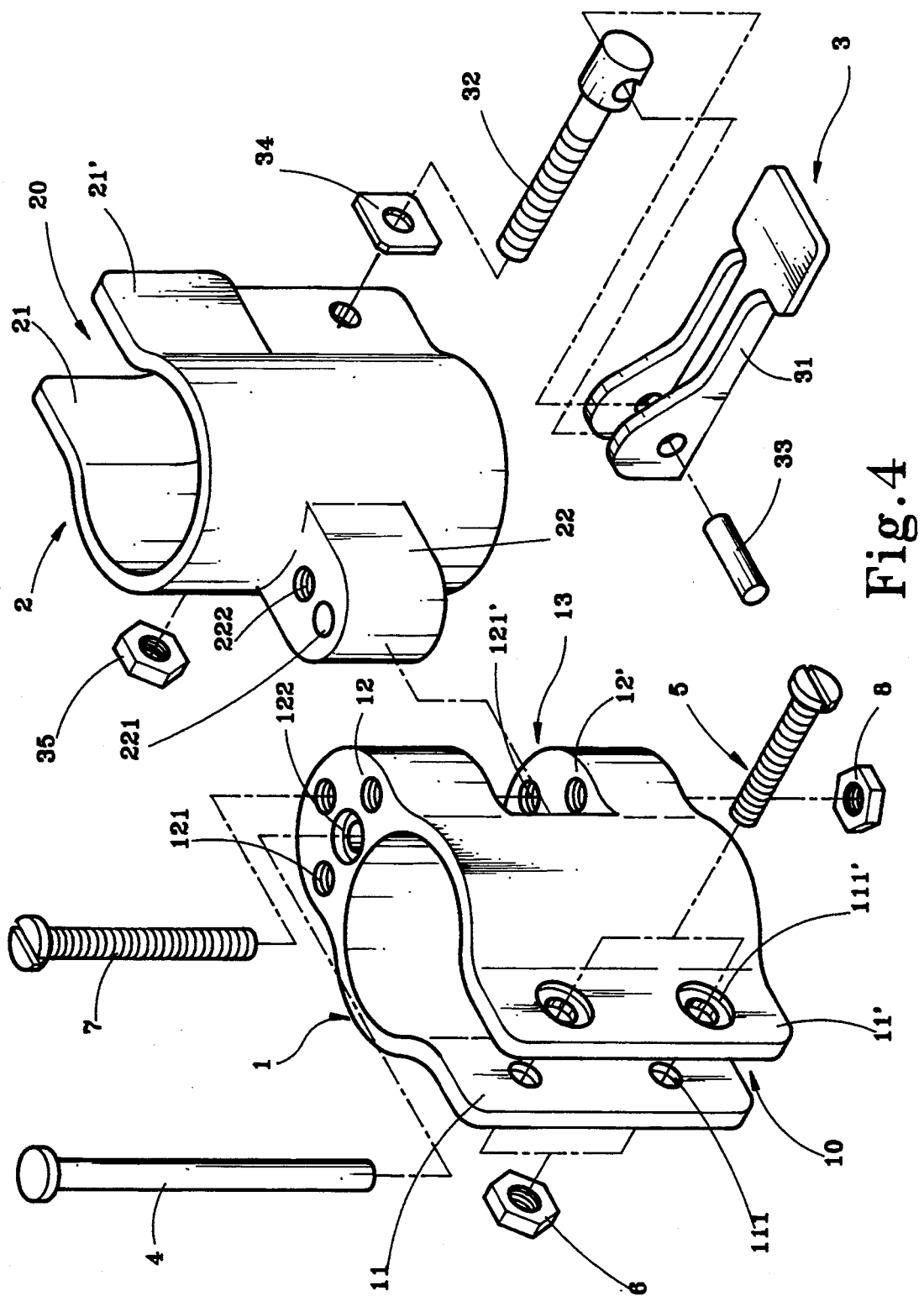
FIG. 4 is an exploded view of a bicycle padlock holder according to the preferred embodiment of the present invention.

Referring to FIG. 4, a bicycle padlock holder in accordance with the preferred embodiment of the present invention is generally comprised of a mounting frame 1 fastened to the seat tube of a bicycle, a padlock carrier frame 2 fastened to the mounting frame 1 for keeping a bicycle padlock, and a tightening up device 3 pivoted to the padlock carrier frame 2 and controlled to tightening up the mouth of the padlock carrier frame 2.

Figure 8:
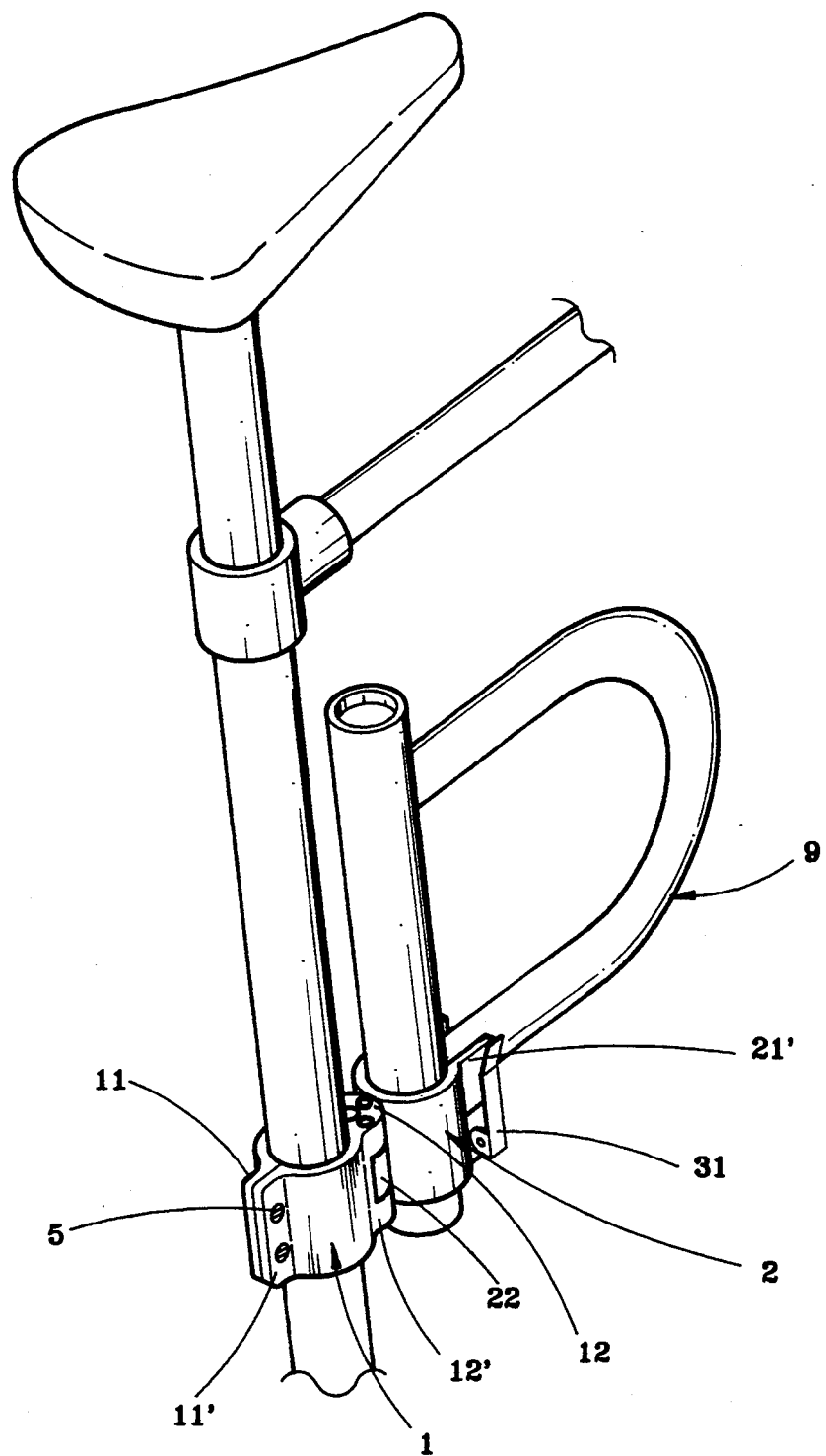
FIG. 8 is an installed view showing the bicycle padlock holder of the present invention fastened to the seat tube of a bicycle to carry a padlock.

The mounting frame 1 is made of tubular shape fitting around the seat tube, having two vertical lugs 11;11' at one side spaced by a mouth 10, and two horizontal lugs 12;12' vertically spaced by a space 13 at an opposite side. The vertical lugs 11;11' have each a plurality of vertically spaced bolt holes 111 or 111' through which screw bolts 5 are respectively inserted and screwed up with a respective nut 6 permitting the mounting frame 1 fixed to the seat tube of the bicycle (see FIG. 8) The horizontal lugs 12;12' have each an axle hole 122 or 122' (the axle hole 122' on the lower horizontal lug 12' is not shown) vertically disposed in the center and a plurality of screw holes 121 or 121' spaced around the axle hole 122 or 122'. The padlock carrier frame 2 is made of tubular shape having two vertical lugs 21;21' at one side spaced by a mouth 20, and a horizontal lug 22 at an opposite side fitted into the space 13 between the horizontal lugs 12;12' of the mounting frame 1. The horizontal lug 22 has an axle hole 221 connected between the axle holes 122;122' by a pivot 4 for permitting the padlock carrier frame 2 to be turned about the pivot 4 in the horizontal direction, and a screw hole 222 alternatively connected to either screw hole 121 on the upper horizontal lug 12 of the mounting frame 1 and the corresponding screw hole 121' on the lower horizontal lug 12' of the mounting frame 1 by a screw bolt 7 and a nut 8.

Figure 5:
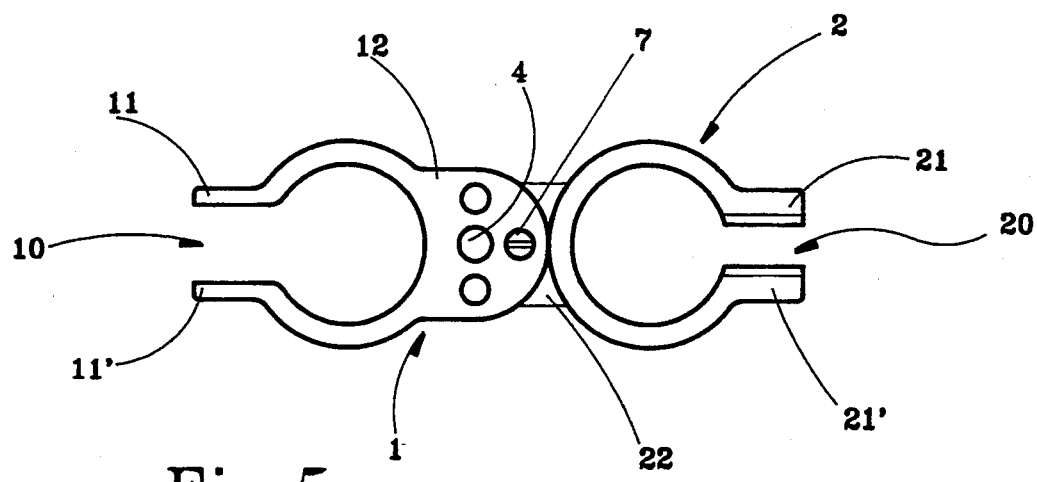
FIG. 5 shows one arrangement of the bicycle padlock holder of the present invention.
Figure 6:
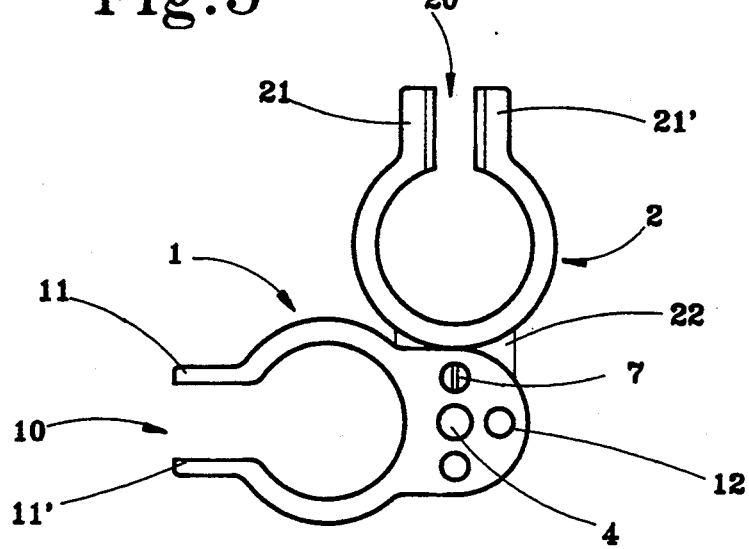
FIG. 6 shows another arrangement of the bicycle padlock holder of the present invention.
Figure 7:
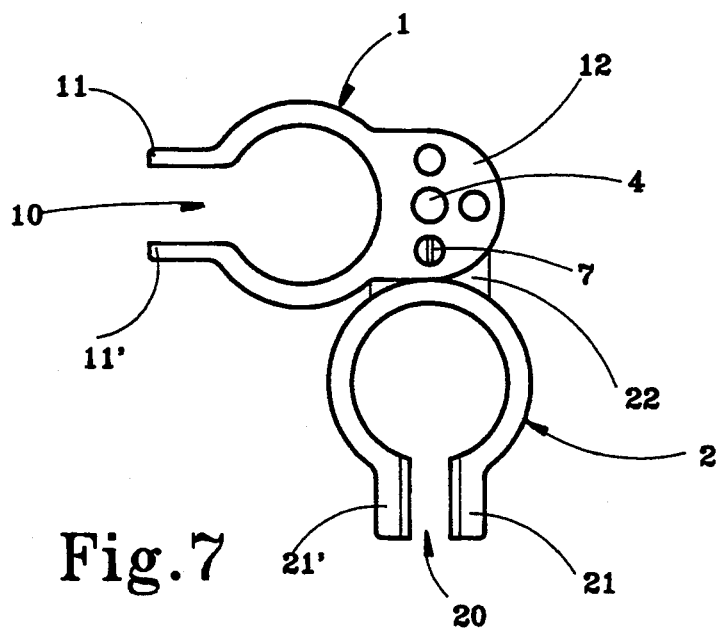
FIG. 7 shows still another arrangement of the bicycle padlock holder of the present invention.

Referring to FIGS. 5, 6, and 7, by changing the connection between the screw hole 222 on the horizontal lug 22 of the padlock carrier frame 2 and the screw holes. 121;121' on the horizontal lugs 12;12' of the mounting frame 1, the angular position of the padlock carrier frame 2 relative to the mounting frame 1 is adjusted.

Referring to FIG. 4 again, the tightening up device 3 is a known mechanism comprises a headed bolt 32 fastened to the two vertical lugs 21;21' of the padlock carrier frame 2 by a washer 34 and a nut 35, and a lever 31 pivoted to the head of the headed bolt 32 by a pivot pin 33. By turning the lever 31 in either direction, the pitch of the mouth 20 is changed, and therefore a bicycle padlock 9 can be firmly retained to the padlock carrier frame 2 (see FIG. 8).

I claim:

1. A bicycle padlock holder comprising a mounting frame fitted around the seat tube of a bicycle and fixed in place by screw bolts and nuts, a padlock carrier frame connected to said mounting frame and controlled by a tightening up device to carry a bicycle padlock, wherein said mounting frame comprises an upper horizontal lug and a lower horizontal lug vertically spaced by a space, said upper and lower horizontal lugs having each an axle hole in the center and a plurality of screw holes spaced around the respective axle hole; said padlock carrier frame comprises a horizontal lug fitted into the space between the upper and lower horizontal lugs of said mounting frame, the horizontal lug of said padlock carrier frame comprising an axle hole connected between the axle holes on the upper and lower horizontal lugs of said mounting frame by a pivot for permitting said padlock carrier frame to be turned around said pivot horizontally, and a screw hole alternatively connected between either screw hole on the upper horizontal lug of said mounting frame and the corresponding screw hole on the lower horizontal lug of said mounting frame by a screw bolt and a nut.

* * * * *